(12) United States Patent
Duquesne et al.

(10) Patent No.: US 10,130,033 B2
(45) Date of Patent: Nov. 20, 2018

(54) COMBINE HARVESTER WITH IMPROVED CHOPPER AND SPREADER ARRANGEMENT

(71) Applicant: CNH Industrial America LLC, New Holland, PA (US)

(72) Inventors: Frank R. G. Duquesne, Zwevegem (BE); Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 82 days.

(21) Appl. No.: 14/889,382

(22) PCT Filed: May 7, 2014

(86) PCT No.: PCT/EP2014/059349
§ 371 (c)(1),
(2) Date: Nov. 5, 2015

(87) PCT Pub. No.: WO2014/180911
PCT Pub. Date: Nov. 13, 2014

(65) Prior Publication Data
US 2016/0150728 A1   Jun. 2, 2016

(30) Foreign Application Priority Data

May 8, 2013   (BE) .................................. 2013/0320

(51) Int. Cl.
*A01F 12/40*   (2006.01)
*A01D 41/12*   (2006.01)
(Continued)

(52) U.S. Cl.
CPC .......... *A01D 41/1243* (2013.01); *A01F 12/18* (2013.01); *A01F 12/40* (2013.01); *A01F 12/442* (2013.01)

(58) Field of Classification Search
CPC combination set(s) only.
See application file for complete search history.

(56) References Cited

U.S. PATENT DOCUMENTS 2,611,407 A * 9/1952 Alloway ................. A01F 12/40
                                              239/680
4,342,319 A    8/1982 Willis et al.
(Continued)

FOREIGN PATENT DOCUMENTS

DE    4218235 A1   12/1993
EP    0631717 A1    1/1995

*Primary Examiner* — Alicia Torres
(74) *Attorney, Agent, or Firm* — Peter K. Zacharias; Patrick M. Sheldrake

(57) ABSTRACT

A combine harvester has at least one rotor oriented in the longitudinal direction of the harvester and configured to separate grains and light chaff from a stream of residue material transported to the distal end of the rotor, where said stream is ejected downwards into a chopper housing. The chopper housing has a pair of chopper wheels configured so that the stream of residue material is ejected directly into the area between said chopper wheels, with essentially no residue being allowed to enter the space between the circumference of the wheels and the sidewalls of the chopper housing. The harvester also has a spreader with a pair of laterally placed spreader openings in the chopper housing, preferably with a pair of spreader snouts mounted on said openings.

13 Claims, 8 Drawing Sheets

(51) Int. Cl.
*A01F 12/18* (2006.01)
*A01F 12/44* (2006.01)

(56) References Cited

U.S. PATENT DOCUMENTS

| | | | |
|---|---|---|---|
| 4,484,587 | A | 11/1984 | Raineri |
| 5,556,042 | A * | 9/1996 | Roberg ................. A01F 12/40 241/101.76 |
| 6,027,407 | A | 2/2000 | Roberg |
| 6,082,647 | A | 7/2000 | Claes |
| 6,416,405 | B1 | 7/2002 | Niermann |
| 6,572,035 | B1 | 6/2003 | Pfeiffer |
| 6,602,131 | B2 | 8/2003 | Wolters |
| 6,616,528 | B2 | 9/2003 | Wolters et al. |
| 6,663,485 | B2 | 12/2003 | Niermann |
| 6,893,340 | B1 | 5/2005 | Schmidt et al. |
| 7,896,732 | B2 | 3/2011 | Benes et al. |
| 8,118,650 | B2 | 2/2012 | Isaac et al. |
| 8,876,583 | B2 | 11/2014 | Roberge et al. |
| 2002/0073675 | A1 * | 6/2002 | Buermann .............. A01F 12/40 56/255 |
| 2002/0077163 | A1 | 6/2002 | Buermann et al. |
| 2003/0109294 | A1 * | 6/2003 | Wolters ................. A01F 12/40 460/112 |
| 2012/0264493 | A1 | 10/2012 | Matousek et al. |

* cited by examiner

COMBINE HARVESTER WITH IMPROVED CHOPPER AND SPREADER ARRANGEMENT

This application is the US National Stage filing of International Application Serial No. PCT/EP2014/059349 filed on May 7, 2014 which claims priority to Belgian Application BE2013/0320 filed May 8, 2013, each of which is incorporated herein by reference in its entirety.

FIELD OF THE INVENTION

The present invention is related to combine harvesters for cutting and processing crop material from a field, in particular to a mechanism for chopping and spreading processed crop material behind the combine.

STATE OF THE ART

Many combine harvesters in use today are equipped with elongate single or twin threshing and/or separation rotors, with their axis mounted in the longitudinal direction of the combine, and configured to transport the crop material from the front of the rotors to the back, during which trajectory the grains are threshed and/or separated from the stalks and leaves of the crop. The grain is gathered together with light chaff in a cleaning arrangement located underneath the rotors, while the crop residue of stalks and leaves (straw) are transported along a helical path by the rotors towards the back end of these rotors. Here, the residue is propelled towards the rear of the combine by a beater, which is a rotating component oriented transversally with respect to the rotor(s). The material is thereby fed into a chopper, comprising a rotating chopper wheel in combination with stationary knives, to chop up the straw into smaller portions. The chopper wheel is arranged transversally with respect to the rotors. After that, the chopped-up material is spread out over the full width of the combine through rotating spreaders, comprising spreader wheels generally oriented with their axis perpendicularly to the movement direction of the combine.

Document US2012-A-0264493 shows a combine wherein a housing containing a set of chopper wheels is placed underneath the end of a single threshing rotor, the chopper wheels rotating about axes that are oriented in the direction of travel of the combine and possibly parallel to the rotor. The crop materials leaving the rotor are fed through an inlet section of the housing towards the chopper rotors. The chopper rotors are equipped with pivotable blades and stationary shear bars or knives, and deliver the chopped material to laterally placed outlet openings through which the material is spread out over the field.

SUMMARY OF THE INVENTION

In the above-described harvesters equipped with a beater, the trajectory followed by the residue after it exits the threshing/separation rotors comprises two abrupt changes in the direction of the material: once at the position of the beater, where it changes from a path that is tangential to the cylindrical surface of the rotors to a path directed along the longitudinal axis of the combine, and again after the chopper where it changes from said longitudinal direction to a path that is tangential to the circumference of the spreader wheels. The direction changes represent a loss in momentum of the material as it moves along the trajectory, which thereby imposes a considerable energy consumption on the combine. In the system described in US-A-2012/0264493, the use of a beater is avoided, but the inlet section between the single rotor and the chopper wheels still represents an interruption in the flow of material towards the spreaders.

The present invention is related to a combine harvester comprising one or more threshing and/or separation rotors oriented in the longitudinal direction of the harvester and configured to separate grains and light chaff from a stream of residue material transported to the distal end of the rotors, where said stream is ejected downwards into a chopper housing. The chopper housing comprises a pair of chopper wheels configured so that the stream of residue material is ejected directly into the area between said chopper wheels, with essentially no residue being allowed to enter the space between the circumference of the wheels and the sidewalls of the chopper housing. The combine harvester further comprises spreader means comprising a pair of laterally placed spreader openings in the chopper housing, preferably with a pair of spreader snouts mounted on said openings.

In a harvester according to the invention, the momentum imparted by the threshing/separation rotors to the residue material as it is ejected downwards by said rotors is not reduced to zero before the material is transported further by the chopper wheels. In this way, the kinetic energy of the material ejected from the rotors is used to 'blow' the material through the chopper wheels and into the spreader openings, with an additional driving force given to the chopped material by the rotation of the chopper wheels themselves so that the material is spread out over a large area.

The invention is in particular related to a combine harvester as described in the appended claims.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1A:
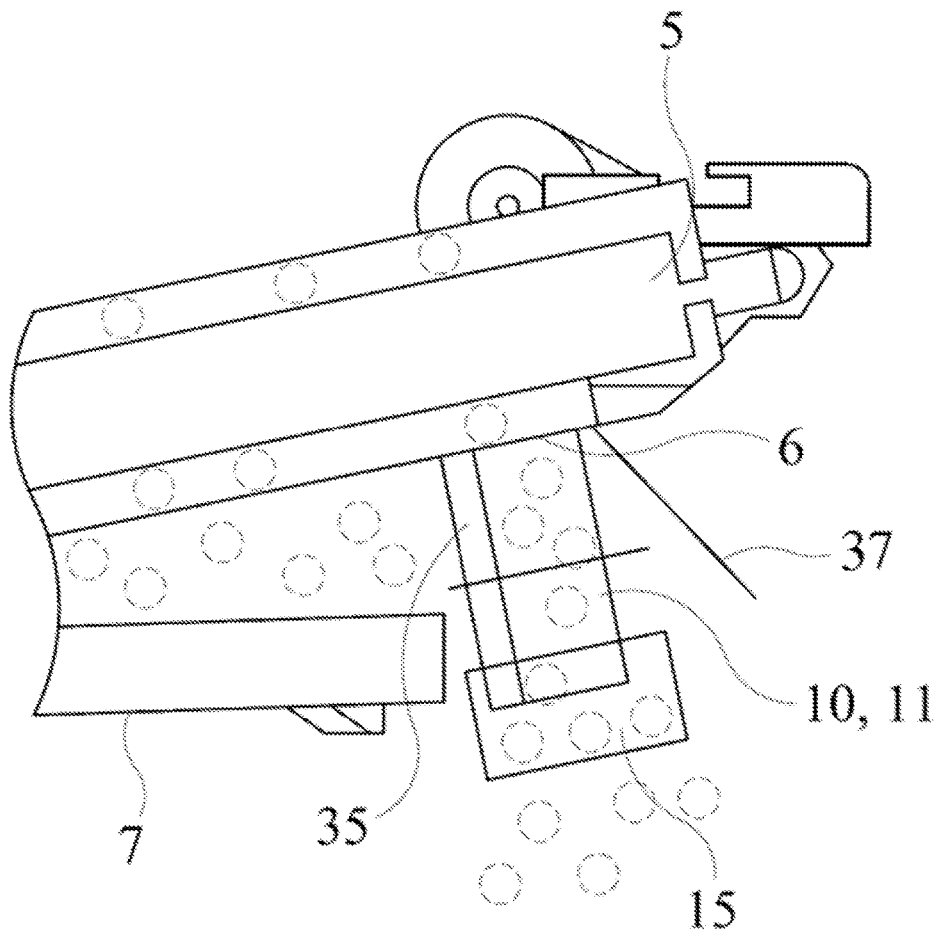
FIG. 1a shows a side view of the main components of a combine harvester according to a preferred embodiment of the present invention.
Figure 1B:
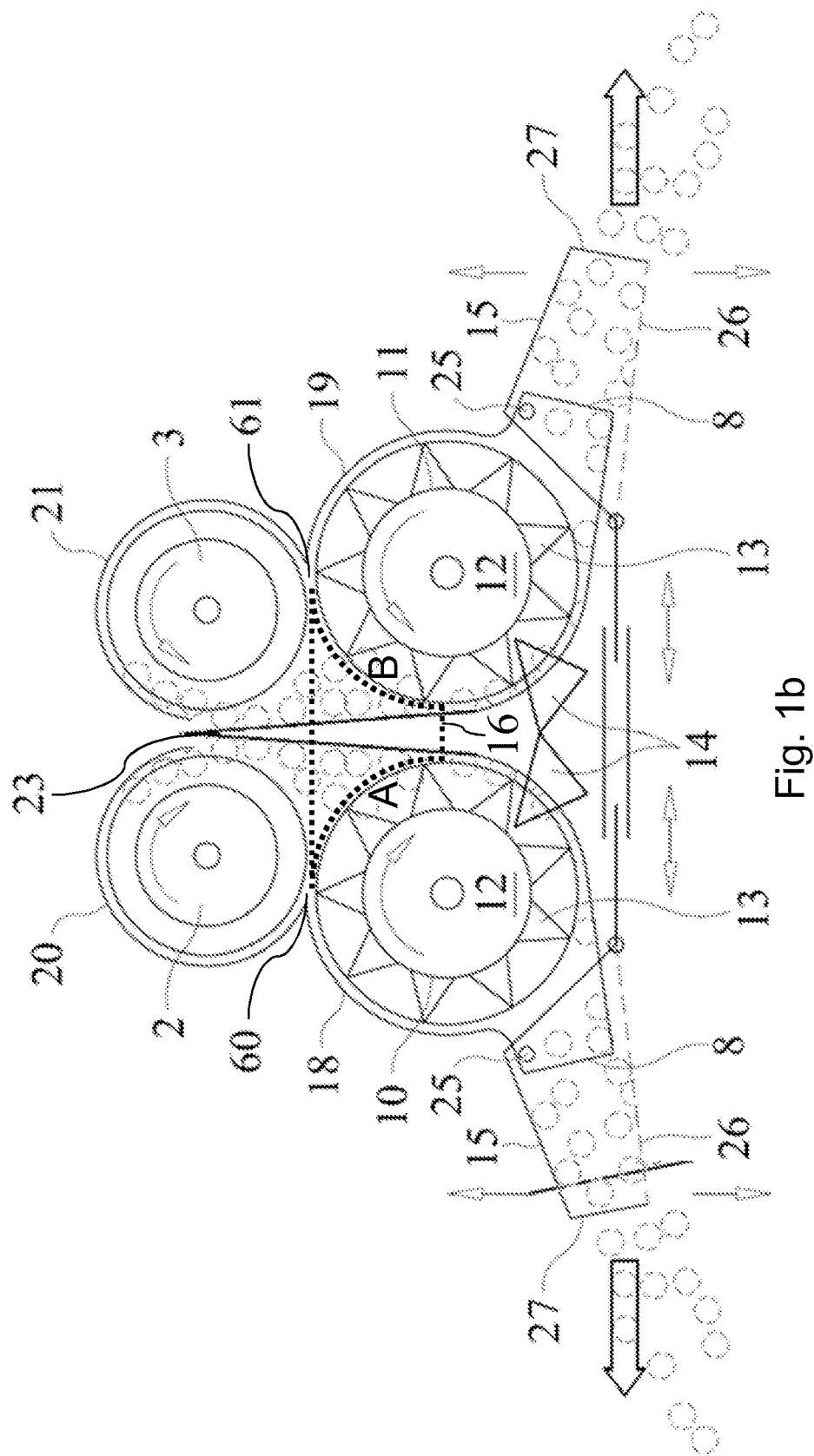
FIG. 1b shows the rear view of the same embodiment.

FIG. 1 shows a side and rear view of the main components in a combine harvester, or 'combine' as referred to hereafter, according to an embodiment of the invention. A feeder 1 receives crops that are cut from the field by a broad combine header (not shown) mounted in front of the feeder, and delivers the crops to the twin threshing and/or separation rotors 2 and 3 (elsewhere in this description and in the claims referred to as 'threshing/separation rotors' or simply 'rotors'), that rotate in the direction indicated by the arrows. The rotors are mounted inside a housing comprising one or more grating assemblies (not shown). Crops advance from the proximal end 4 of the rotors to the distal end 5 along a helical path, during which they are processed by threshing elements (not shown) mounted on the rotors. A layer of advancing crops is thus formed around each of the rotors, while the threshing action separates grains and light chaff from the larger stalks and leaves of the material. The grains and light chaff fall through the grating assemblies and are gathered by the cleaning arrangement 7 located underneath the rotors, where it is further sorted through a set of sieves, with a portion of the light chaff being blown towards the rear of the combine by a ventilator (not shown). The remaining crop material consisting mainly of larger stalks and leaves, and referred to hereafter as residue material, continues towards the distal end 5 of the rotors where it needs to be evacuated from the machine, either by depositing a swath of uncut residue on the ground, or by chopping the residue into smaller pieces by a chopper arrangement and spreading out said pieces over a width of terrain corresponding essentially to the width of the combine header.

In the combine harvester according to the embodiment of FIG. 1, the thresher housing is provided with a discharge opening 6, located in the vicinity of the distal end 5 of the rotors 2/3. The opening 6 is positioned at the underside of the thresher housing, so that a stream of residue material is ejected downward through the opening 6, with a speed imparted to the material by the rotational movement of the rotors 2/3. A pair of chopper wheels 10 and 11, arranged side by side and rotatable in opposite direction about an axis that is parallel to the rotors 2/3, is mounted underneath the discharge opening 6. The chopper wheels are cylinders 12 with blades or knives 13 attached to the circumference. The chopper wheels 10/11 are configured to receive the crop material ejected downward in the space between said chopper wheels and to move the material towards stationary knives 14, so that the crops are cut between the rotating and stationary knives and ejected through discharge openings 8, onto which lateral spouts 15 are mounted which spread the material out over the field in an area behind the advancing combine. In operation, the left and right chopper wheels 10/11 rotate in the same direction as the left and right threshing/separation rotors 2/3 respectively, as indicated by the arrows.

The configuration of the rotors 2/3 and the chopper wheels 10/11 is such that essentially all of the material ejected by the rotors is delivered directly to the area 16 between the chopper wheels. This area is defined as the area delimited at the top by the plane that is tangential to the circumference of both chopper wheels 10/11, at the sides by these circumferences as such, and at the bottom by the plane connecting the rotation axes of both chopper wheels. 'Essentially all of the material' should be understood as 'all the material above the size of dust particles and crop particles of a size that is the same order of magnitude as dust particles'. 'Delivered directly' means that the material ejected from the rotors 2/3 follows a path that does not go beyond the lateral sections A and B of the area 16 (see FIG. 1*b*).

In the embodiment shown in FIG. 1, the direct delivery of residue to the area 16 is achieved by a number of features. First of all, the chopper wheels 10/11 are placed as close as possible to the rotors 2/3, with a small clearance 60/61 between the circumference of each chopper wheel 10/11 and the respective rotor 2/3, the locations of said clearances being defined as the locations where the distance between the chopper wheels and the rotors is minimal. The size of the 'small clearance' is such that no material above said dust particle-size is allowed to enter said clearances 60/61 in the lateral direction (i.e. from the area between the chopper wheels to the area outside the chopper wheels). Moreover, due to the close proximity of the chopper wheels to the rotors, the chopper wheels are able to 'scrape off' residue material from the surface of the rotors and direct it into the area 16. This ensures that essentially no material is transported beyond said sections A and B in the lateral direction, and that the stream of residue material is 'delivered directly' (as defined above) into the area 16 between the chopper wheels.

Furthermore, the chopper wheels 10/11 are mounted in a housing provided with side walls 18/19, shaped as cylindrical surfaces that envelop the chopper wheels 10/11 respectively with a small clearance between these walls and the outer circumference of the chopper blades 13 (defined as the circumference of the chopper wheels as such), small enough to obstruct the passage of residue material sized above the above-described dust particle size.

Likewise, the side walls 20/21 of the thresher housing that envelops the rotors 2/3 at the location of the discharge opening 6 are equally formed as cylindrical surfaces which envelop these rotors with a small clearance between these walls and the outer circumference of the rotors 2/3, small enough to obstruct the passage of residue material sized above the above-described dust particle size. In the embodiment shown, the thresher housing walls 20/21 are joined to the chopper housing along lines that are common to the respective cylindrical housing walls 18/20 and 19/21 of the chopper and thresher housings.

The above-described small clearances 60/61 between the chopper and threshing arrangement may be applied in combination with other shapes of the chopper and/or thresher housing side walls, with larger clearances between the rotors and wheels one the one hand and said side walls on the other, given that these small clearances 60/61 may as such be sufficient to ensure that essentially all of the residue is ejected into the area 16. The sidewalls 18/19 and/or 20/21 of the chopper and thresher housings may have a shape that is different from a purely cylindrical shape, but which has at least a portion that is placed at the above-described small clearance with respect to the circumference of the respective chopper wheels and rotors.

Figure 2:
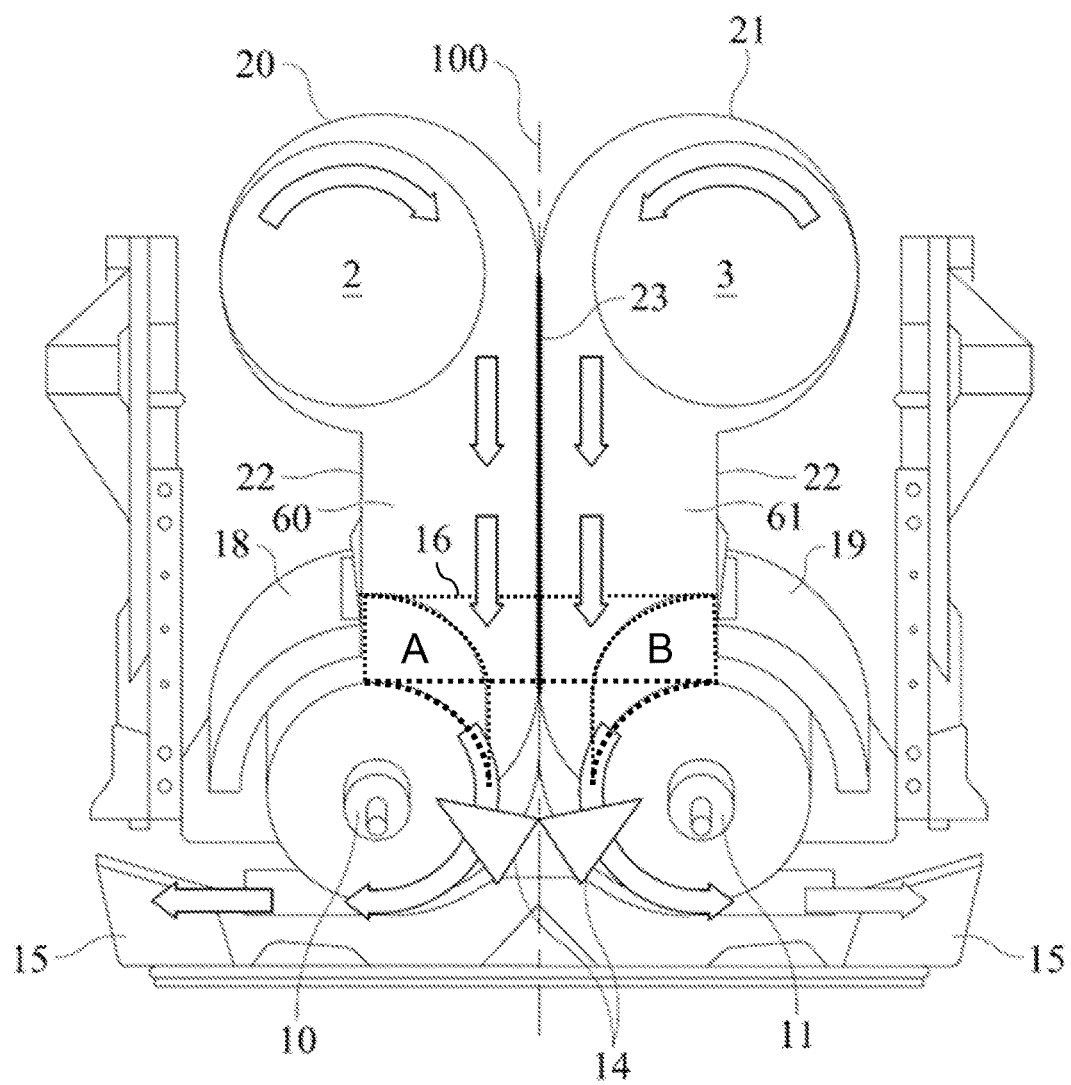
FIG. 2 shows a rear view of a second embodiment of the combine of the invention, with a higher distance between the threshing/separation rotors and the chopper wheels.

When the distance between the rotors 2/3 and the chopper wheels 10/11 is larger than shown in the embodiment of FIG. 1, another means for obstructing the passage of residue material beyond the sections A and B in the lateral direction may be required. This may be obtained by the cylindrical walls 18 and 19 as such, wherein these walls are then circumventing the chopper wheels at least up to the sections A and B. FIG. 2 illustrates such an embodiment, further comprising a connecting wall 22 between the respective pairs of cylindrical wall portions 18,20 and 19,21. The area 16 between the chopper wheels is again indicated, bordered at the top by the plane that is tangential to the chopper wheels, extending between lateral sections A and B. In this case, the ridge formed by bottom end of the walls 22 and the end of the cylindrical walls 18/19 is placed at a small clearance 60/61 (small enough to essentially prevent residue material entering said clearances in the lateral direction) from the circumference of the respective chopper wheels. In this case, the location of said clearances 60/61 corresponds essentially to the location of said sections A and B. This again ensures that essentially no residue material travels beyond said sections A and B and that the stream of residue is 'delivered directly' in area 16. The clearances 60/61 could alternatively be placed closer to the centre plane 100 between the chopper wheels.

Any other suitable means for preventing residue material above said dust particle size from being transported beyond sections A and B in the lateral direction (i.e. from the area between the chopper wheels to the area outside the chopper wheels), may be applied in a combine harvester according to the invention. This may involve any suitable obstruction means placed above each chopper wheel, at a clearance small enough to essentially prevent residue material from entering said clearance, and wherein said clearance or at least a portion of said clearance is located at or closer to the centre line 100 of the chopper housing compared to the location of said sections A and B. Examples of said obstruction means have been given in the described embodiments. In the embodiment of FIG. 1, the obstruction means are formed by the threshing/separation rotors 2/3 themselves. In the embodiment of FIG. 2, the obstruction means are formed by the combined effect of the vertical walls 22 and the cylindrical walls 18/19. Another embodiment could have only a pair of vertical walls 22 and a chopper housing that is not closely circumventing the chopper wheels Provided that the clearance between the vertical walls and the chopper wheels is small enough to essentially prevent residue material from entering said clearance from the inside to the outside, this will equally ensure that the stream of residue material is delivered directly into the area 16.

Other ways of directing the stream of residue material ejected by the rotors 2/3 directly into the area 16 are within the scope of the present invention, for example by shaping the sidewalls 22 in the embodiment of FIG. 2 in such a way that they direct the stream downward but directed towards the centre plane 100. In the latter case, the clearances 60/61 could be larger than the 'small clearance' defined above and/or situated beyond the lateral sections A and B of the area 16, as seen from the centre plane 100.

With any of the above-described configurations, it becomes possible to choose the rotational speed of the chopper wheels 10/11 relatively to the speed of the threshing/separation rotors 2/3 so that the momentum imparted by the rotors to the residue material as it is ejected from the discharge opening 6 is not reduced to zero before the material is transported further by the chopper wheels 10/11. In this way, the kinetic energy of the material ejected from the threshing/separation rotors is used to 'blow' the material through the chopper wheels and into the spreader spouts 15, with an additional driving force given to the chopped material by the rotation of the chopper wheels 10/11 themselves so that the material is spread out over a large area.

According to the preferred embodiment and illustrated in both FIG. 1 and FIG. 2, the flow of residue material ejected by the rotors 2/3 into the chopper housing is separated by a separating wall 23 that is placed in between the two chopper wheels 10 and 11, so that the stream of residue material is separated into two parallel streams. This wall 23 improves the distribution of the material in the area between the rotors 2/3 and the chopper wheels 10/11.

The spreader spouts 15 are preferably rotatably mounted on the chopper housing, e.g. hinging about hinges 25, so that the direction into which the material is ejected can be adapted. According to an embodiment, the chopper housing and the bottom of the spouts 15 is provided with openings 26 so that material is not only ejected through the mouth sections 27 of the spouts but also through these openings 26.

Figure 3A:
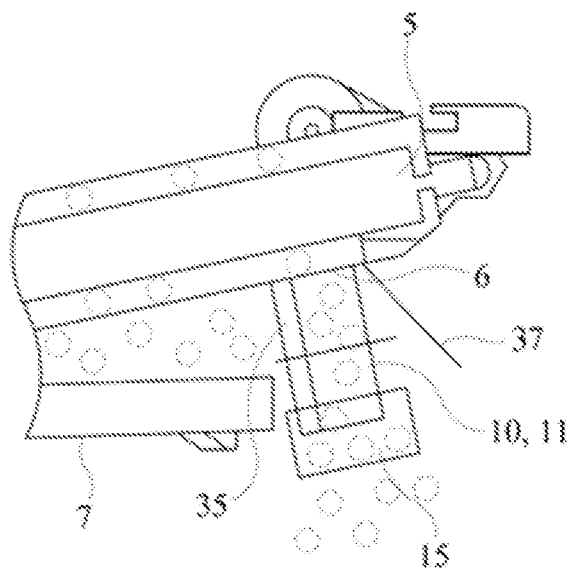
FIGS. 3a, 3b and 3c show an embodiment provided with movable covers for closing off the stream of residue material from the rotors to the chopper wheels.
Figure 3A:
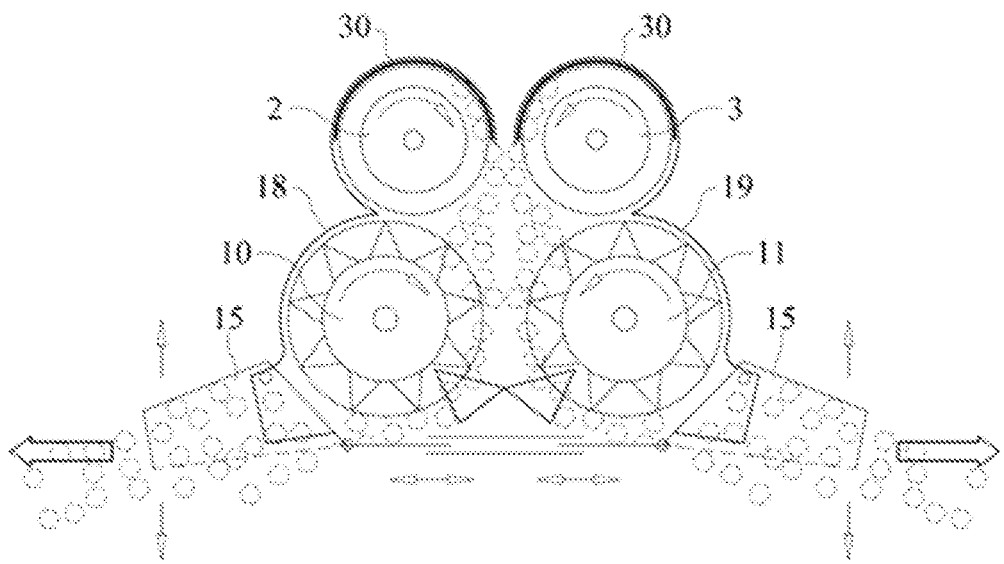
Figure 3B:
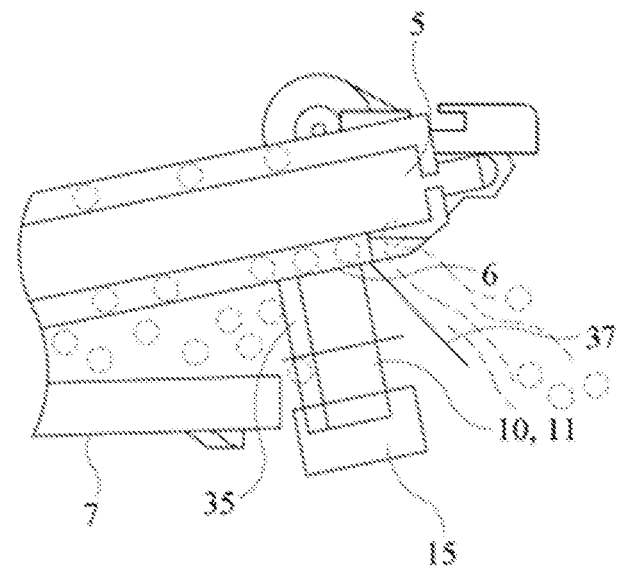
Figure 3B:
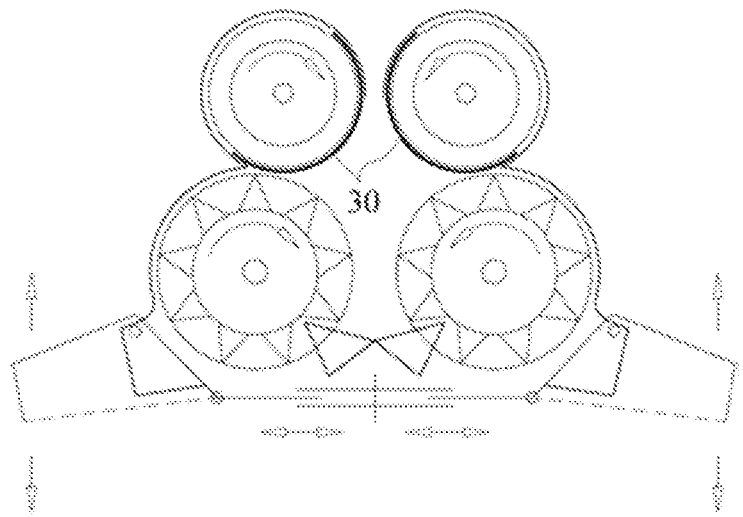

A combine according to the invention may be provided with a means for closing off the discharge opening 6, so that the residue is not ejected through this opening to the chopper wheels 10/11 but further transported to the distal end 5 of the threshing/separation rotors, where it is discharged from the combine in the form of a single swath of unprocessed residue material, to be dried and gathered later for example by a baler. A tilted (preferably tiltable) plate 37 (FIG. 1) may be provided for guiding the swath towards the ground. The closing off of the discharge opening 6 may be brought into practice by any suitable closing mechanism. According to one embodiment, a set of movable covers 30 is provided for this purpose, as illustrated in FIG. 3 for the case of the twin rotor arrangement. One cover 30 is provided for each rotor 2/3. The width of the covers (in the direction perpendicular to the drawing) is at least corresponding to the width of the discharge opening 6. In the open condition (FIG. 3a), the covers 30 are located on the outside of the thresher housing walls 20/21. The covers are rotatable about the same rotation axis as the rotors. To reach the closed condition, the covers are rotated towards each other, entering the area between the rotors, until they effectively close off the discharge opening, as illustrated in FIG. 3b. When the discharge opening 6 is closed off, only the light chaff coming from the cleaning arrangement is spread out through the openings 8, while the residue material is deposited in a single swath via the plate 37.

Figure 3C:
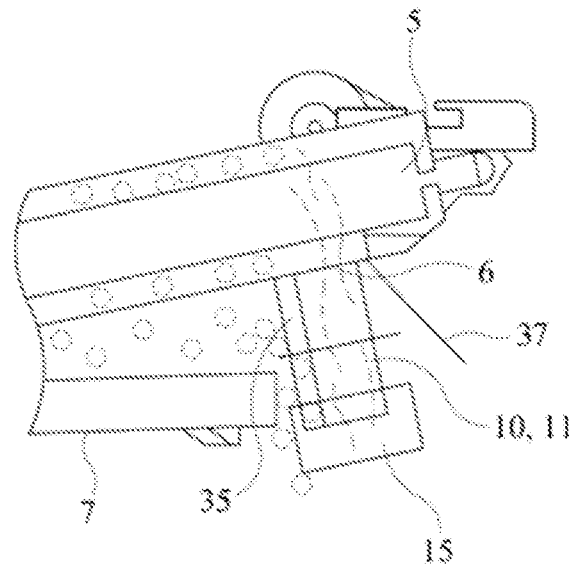
Figure 3C:
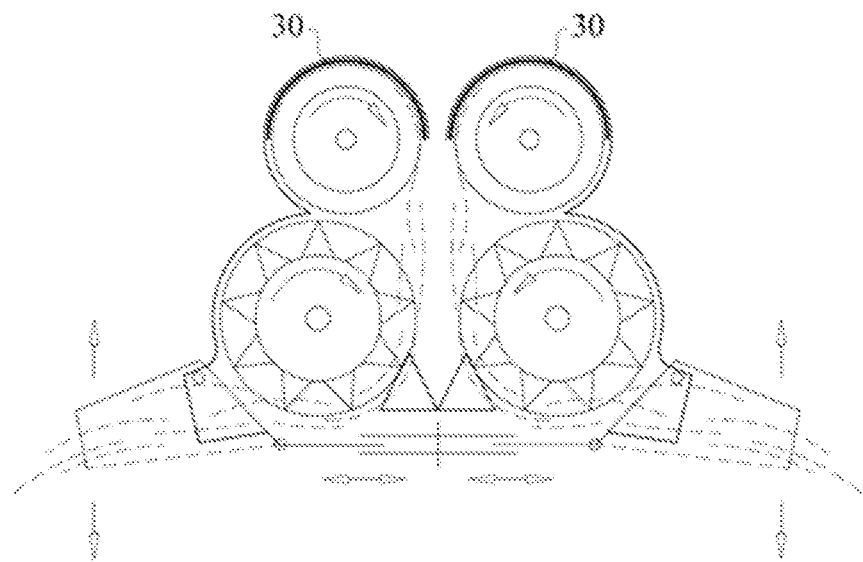

According to the embodiment of FIG. 3c, the stationary knives 14 are retractable from the cutting position. When retracted, the residue is not chopped in the chopper housing, but the unprocessed residue is evacuated from the combine by the rotation of the chopper wheels 10/11 and through the spreader spouts 15, from which two swathes of material are deposited on the field, on either side of the combine's longitudinal direction. In the embodiment shown here, the light chaff coming from the cleaning arrangement is spread out through the openings 8, while the residue material is deposited in two swaths via spouts 15. Alternatively, the openings 8 are closed and also the chaff is deposited by the spouts 15 only.

In the embodiment of FIG. 1, a set of impeller wheels 35 is mounted adjacent to the chopper housing, mounted in a separate impeller housing and rotatable about the same rotation axes as the chopper wheels 10/11. Possibly, the impeller wheels 35 are fixed to the same axle as the respective chopper wheels 10/11 and thus driven by a single drive means together with the chopper wheels, or alternatively they can be driven separately from the chopper wheels. The impeller wheels are configured to attract a flow of light chaff from the cleaning arrangement 7 and deliver said flow into the same lateral spreader discharge openings 8 through which the chopped residue material is spread out on the field. When the discharge opening 6 is closed off, only the light chaff coming from the cleaning arrangement is spread out through the openings 8, while the residue material is deposited in a single swath via the plate 37.

Figure 4:
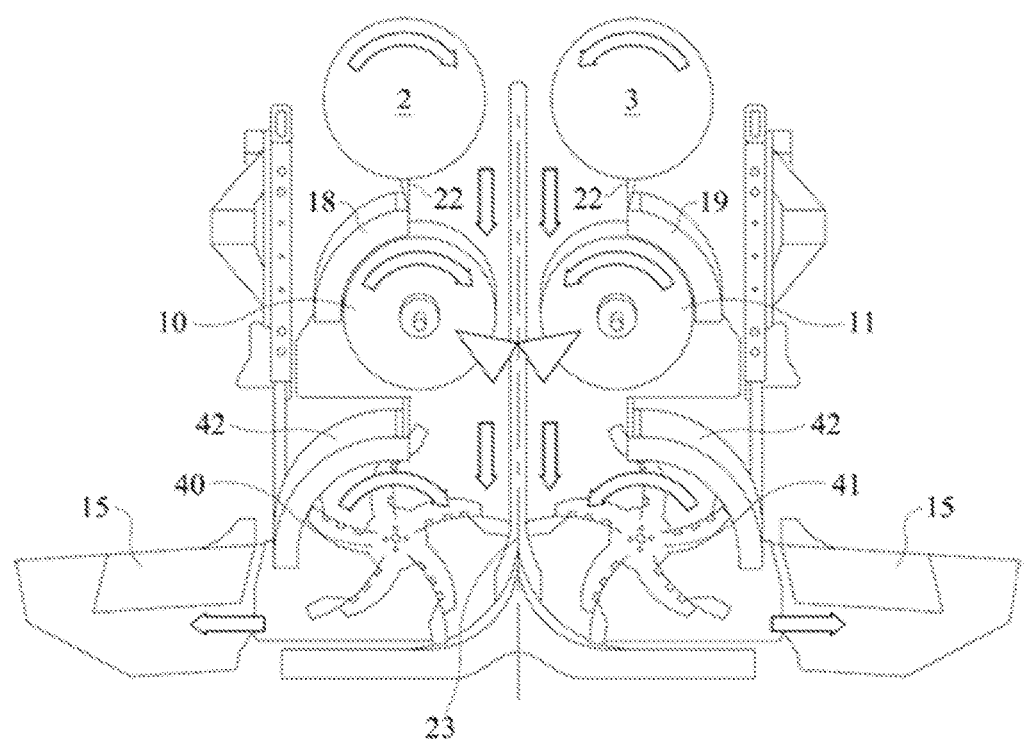
FIG. 4 shows a rear view of a third embodiment of the combine of the invention, with an additional set of spreader wheels mounted underneath the chopper wheels.

FIG. 4 illustrates an embodiment wherein an additional set of spreader wheels 40/41 is mounted underneath the chopper wheels 10/11. Like the chopper wheels 10/11 and the threshing/separation rotors 2/3, the spreader wheels 40/41 have rotational axes that are oriented in the longitudinal direction of the combine, preferably parallel to the axes of the chopper wheels 10/11 and/or to the axes of the rotors 2/3. The spreader wheels 40/41 are mounted in a housing 42, preferably provided with a separating wall 23 between the two spreader wheels, so that separate streams of material enter the spreader housing from the top. Said separate streams are accelerated by the spreader wheels and propelled through the spreader spouts 15 which can be identical to the spreader spouts described with respect to the embodiment of FIG. 1.

The combine harvester of the invention allows to process crop materials according to the method of the invention, by setting the correct speeds of the chopper wheels 10/11 and the threshing/separation rotors 2/3, in dependence of the type of crop, humidity conditions or other parameters, so that no material is allowed to accumulate in the area between the rotors and the chopper wheels. In existing systems such as the one disclosed in US2012/0264493, this is impossible given that residue material enters a broad inlet area that exceeds the width of the area between the chopper wheels.

Figure 5:
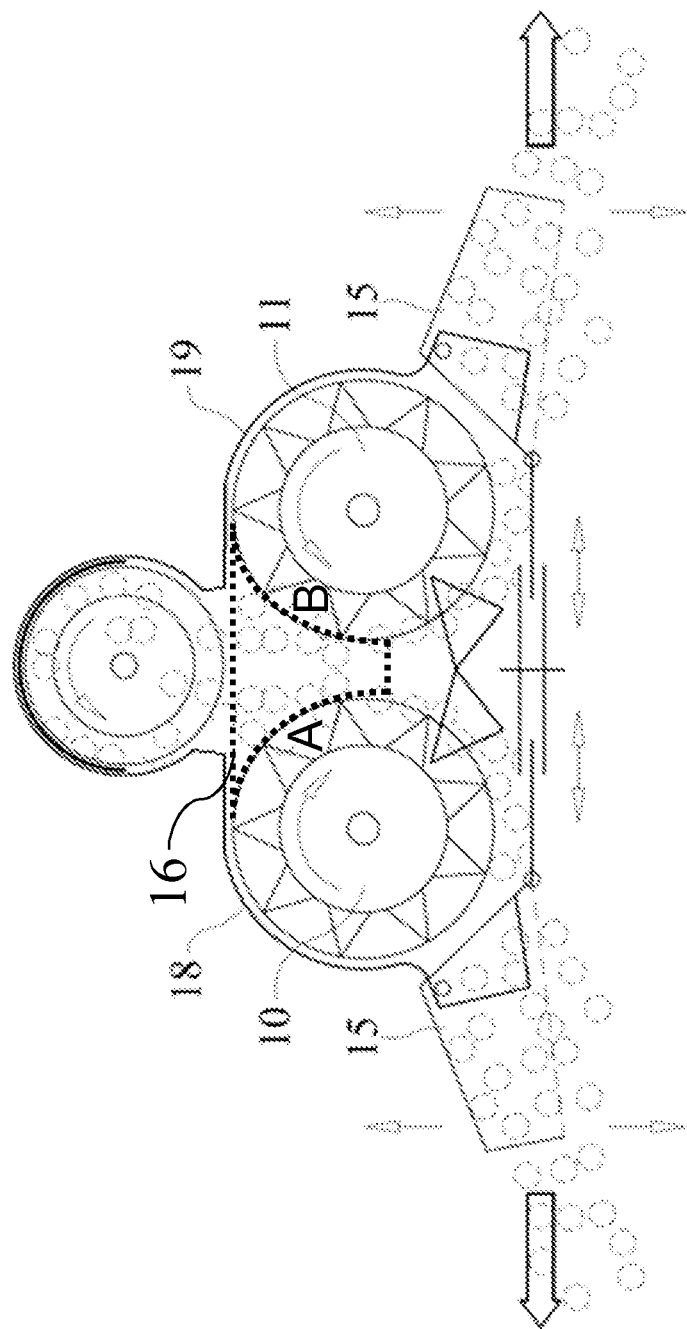
FIG. 5 illustrates an embodiment with a single rotor.

The invention is not limited to a combine equipped with a twin rotor arrangement, but can also be applied to a single rotor arrangement. In that case the same chopper/spreader arrangement according to any of the embodiments described above can be mounted underneath the single rotor, for chopping the stream of residue material ejected by said rotor through a discharge opening. This configuration is illustrated in FIG. 5. The area 16 between the chopper wheels is shown again, bordered by the sections A and B as defined above.

The invention claimed is:

1. A combine harvester for harvesting and processing crops by separating grains from residue material, the combine harvester comprising:
   a threshing arrangement comprising at least one rotor mounted in a longitudinal direction of the combine harvester, the at least one rotor extending through a threshing housing of the combine harvester, and configured to separate grains and light chaff from a stream of residue material, and further to eject the stream of residue material in a downward direction, the at least one rotor having a rotation axis substantially oriented in the longitudinal direction of the combine harvester;
   a chopper arrangement configured to receive the stream of residue material, the chopper arrangement comprising:
      first and second rotatable chopper wheels configured to rotate about respective first and second axes in opposite directions and arranged side by side in a chopper housing, underneath the at least one rotor; and
      a stationary cutter configured to cooperate with the chopper wheels to cut the residue material so as to produce two streams of chopped material; and
   a spreader configured to receive the streams of chopped material and spread the chopped material in an area behind the combine harvester,
   wherein the threshing and chopper arrangements are configured so that essentially all of the material in the stream of residue material is ejected directly into an area between the first and second axes of the chopper wheels, and the chopper wheels each rotate in a direction to provide a driving force to the stream of residue material downward between the chopper wheels;
   wherein the combine harvester further comprises:
      a pair of walls extending between the threshing housing and the chopper housing such that the crop material is directed from the threshing arrangement to the chopper arrangement through the area between the first and second axes; and
      a divider within the pair of walls between the first and second chopper wheels and between the threshing arrangement and the chopper arrangement.

2. The combine harvester according to claim 1, wherein the chopper wheels are mounted parallel to the at least one rotor with a small clearance between a circumference of each chopper wheel and a circumference of the at least one rotor, so as to prevent residue material from entering the clearance.

3. The combine harvester according to claim 1, wherein said chopper housing comprises a first and second sidewall, each sidewall having at least a portion that is placed with a small clearance between the portion and circumferences of the first and second chopper wheels so as to prevent residue material from entering the clearance between the portion of the first and second side wall and the circumferences of the first and second chopper wheel.

4. The combine harvester according to claim 3, wherein sidewalls of the chopper housing are each provided with an at least partly cylindrical surface, each cylindrical surface enveloping a portion of the circumference of a respective one of the chopper wheels with a small clearance between the surface and the circumference of the wheel, so as to prevent residue material from entering the clearance between the cylindrical surface and the chopper wheel circumference.

5. The combine harvester according to claim 1, wherein the thresher housing comprises a discharge opening through which to eject the stream of residue material.

6. The combine harvester according to claim 5, having two rotors and wherein the thresher housing comprises two sidewalls, each having an at least partly cylindrical surface at a location of the discharge opening, each cylindrical surface enveloping a circumference of one of the rotors with a small clearance between each cylindrical surface and the circumference of the one of the rotors, so as to essentially prevent residue material from entering the clearance between each cylindrical surface and the circumference of the one of the rotors.

7. The combine harvester according to claim 5, wherein the thresher housing further comprises a movable cover assembly configured to close off or open the discharge opening, the combine harvester further comprising a discharge plate evacuating a swath of residue material from the threshing arrangement when the cover assembly is in the closed condition.

8. The combine harvester according to claim 7, wherein the cover assembly comprises at least one cover having a cylindrical surface that is concentric with the at least one rotor, the at least one cover being arranged to be rotatable about the rotation axis of the at least one rotor, so as to be movable between an open condition wherein the cover is located outside the thresher housing, and a closed condition, wherein the cover is located underneath the discharge opening.

9. The combine harvester according to claim 1, wherein the spreader comprises a pair of hinged spreader snouts mounted on laterally placed spreader openings of the chopper housing and configured to spread the streams of chopped material in the area behind the combine harvester.

10. The combine harvester according to claim 1, wherein the spreader comprises two rotatable spreader wheels arranged side by side, underneath the chopper wheels, with rotation axes in the longitudinal direction of the combine harvester, and configured to receive the streams of chopped material and propel the streams towards laterally placed spreader openings of the chopper housing.

11. The combine harvester according to claim 1, further comprising a set of rotatable impeller wheels, each oriented and configured to rotate about a common axis with a respective one of the chopper wheels, and configured to convey a stream of light chaff from a cleaning arrangement located underneath the at least one rotor towards the spreader, so that the light chaff may be spread together with the streams of chopped material.

12. The combine harvester according to claim 1, wherein the at least one rotor comprises twin rotors mounted side by side, and each of the rotors has one of the chopper wheels mounted underneath, wherein each of the rotors is configured for rotation in the same direction as the one of the first and second chopper wheel it is mounted above.

13. The combine harvester according to claim 1, wherein said chopper housing comprises first and second generally cylindrical enclosures, the first and second enclosures partially surrounding respective first and second choppers, the first and second enclosures having inlets aligned to receive material from between the pair of walls.

* * * * *